(12) United States Patent
Biswas et al.

(10) Patent No.: US 10,229,138 B2
(45) Date of Patent: Mar. 12, 2019

(54) METHOD AND APPARATUS FOR TAGGED DELETION OF USER ONLINE HISTORY

(71) Applicant: Nokia Technologies Oy, Espoo (FI)

(72) Inventors: Debmalya Biswas, Lausanne (CH); Gian Paolo Perrucci, Lausanne (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/628,146

(22) Filed: Sep. 27, 2012

(65) Prior Publication Data

US 2014/0089272 A1    Mar. 27, 2014

(51) Int. Cl.
*G06F 17/30* (2006.01)

(52) U.S. Cl.
CPC .... *G06F 17/30303* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 6,629,104 B1* | 9/2003 | Parulski | G06F 17/30265 348/231.2 |
| 2007/0203923 A1 | 8/2007 | Thomas | |
| 2008/0201304 A1 | 8/2008 | Sue | |
| 2009/0063438 A1* | 3/2009 | Awad | G06Q 10/10 |
| 2009/0185763 A1* | 7/2009 | Park | H04M 1/7253 382/311 |
| 2011/0153614 A1 | 6/2011 | Solomon | |
| 2012/0023103 A1* | 1/2012 | Soderberg et al. | 707/739 |
| 2012/0023128 A1* | 1/2012 | Sammon | 707/769 |
| 2013/0129142 A1* | 5/2013 | Miranda-Steiner | 382/103 |

FOREIGN PATENT DOCUMENTS

| | | |
|---|---|---|
| EP | 2 068 248 A1 | 6/2009 |
| WO | 2007/059284 A1 | 5/2007 |

OTHER PUBLICATIONS

Chavanu, Tips to Help You Get More Done With Photo Stream, May 21, 2012, accessed Apr. 18, 2017 at http://www.makeuseof.com/tag/tips-photo-stream-ios-os/.*

Viana, W., Bringel Filho, J., Gensel, J., Villanova-Oliver, M., & Martin, H. (2008). PhotoMap: from location and time to context-aware photo annotations. Journal of Location Based Services, 2(3), 211-235. (Year: 2008).*

(Continued)

*Primary Examiner* — William Spieler
(74) *Attorney, Agent, or Firm* — Alston & Bird LLP

(57) ABSTRACT

An approach is provided for deleting a user's online data across different services and platforms based on contextual selection criteria. The deletion manager determines at least one request to delete data associated with at least one user, the request specifying at least in part one or more contextual parameters. The deletion manager determines one or more data records associated with the at least one user from one or more services, one or more applications, or a combination thereof. The deletion manager causes, at least in part, a deletion of the one or more data records based, at least in part, on whether the data at least substantially meet the one or more contextual parameters.

17 Claims, 10 Drawing Sheets

(56) References Cited

OTHER PUBLICATIONS

International Search Report for corresponding International Application No. PCT/IB2013/058054, dated Jan. 29, 2014, 6 pages.
Written Opinion for corresponding International Application No. PCT/IB2013/058054, dated Jan. 29, 2014, 8 pages.
Abine, "DeleteMe", retrieved from the Internet: http://web.archive.org/web/20120826101647/http://www.abine.com/cnn/rooftop/, retrieved Jan. 17, 2014, 2 pages.
Abine, "DeleteMe F.A.Q", retrieved from the Internet: http://web.archive.org/web/20101103221231/http://www.abine.com/deleteme/faq.php, retrieved Jan. 17, 2014, 4 pages.
Abine, "DeleteMe Request Form", retrieved from the Internet: http://web.archive.org/web/20101025082512/http://abine.com/deleteme/request.php?item=google>, retrieved Jan. 17, 2014, 3 pages.
Extended European Search Report for corresponding European Application No. 13840707.7 dated Apr. 29, 2016, 11 pages.
The Right to Be Forgotten | Stanford Law Review [online] [retrieved Oct. 26, 2016]. Retrieved from the Internet: <URL: https://www.stanfordlawreview.org/online/privacy-paradox-the-right-to-be-forgotten/>.(dated Feb. 2012) 2 pages.
European 'right-to-delete' law: How enforceable is Facebook? | ZDNet [online] [retrieved Oct. 26, 2016]. Retrieved from the Internet: <URL: http://www.zdnet.com/article/european-right-to-delete-law-how-enforceable-is-facebook/>. (dated Nov. 14, 2011) 8 pages.
Free Download Cleanup Tools—Clean surfing history, browser cache, cookies, registry, t . . . [online] [retrieved Oct. 26, 2016]. Retrieved from the Internet: <URL: http://www.scanwith.com/Cleanup-Tools.htm> (dated Oct. 17, 2006) 2 pages.
Separation of concerns—Wikipedia [online] [retrieved Oct. 26, 2016]. Retrieved from the Internet: <URL: https://en.wikipedia.org/wiki/Separation_of_concerns> (dated Oct. 13, 2016) 4 pages.
Sign in—Google Accounts [online] [retrieved Oct. 26, 2016]. Retrieved from the Internet: <URL: https://accounts.google.com/ServiceLogin?serviceaccountsettings&Passive=1209600&o . . . > (undated) 1 page.
Office Action for European Application No. 13 840 707.7 dated Mar. 3, 2017.
Office Action for European Patent Application No. 13840707.7 dated Mar. 9, 2018, 9 pages.
Khungar, S. et al., *A Context Based Storage System for Mobile Computing Applications*, Mobile Computing and Communication Review, vol. 9, No. 1 (Jan. 2005) 64-68.

* cited by examiner

METHOD AND APPARATUS FOR TAGGED DELETION OF USER ONLINE HISTORY

BACKGROUND

Service providers and device manufacturers (e.g., wireless, cellular, etc.) are continually challenged to deliver value and convenience to consumers by, for example, providing compelling network services. One area of interest has been the development of online services and platforms that enable users to more effectively share content, personal information, comments, etc. (i.e., online data) with friends, colleagues, and the public at large on the Web. More specifically, this type of sharing can include, at least in part, real-time updates (e.g., posting a current location or status on a social networking service) and more static updates (e.g., posting a comment or opinion on a blog or message board). In addition, users are joining a growing number of social networking services and/or blogs with different content and friends among the networks. Consequently, unless specifically prohibited or blocked, much of the information that a user shares is unknowingly available to various third parties and can be readily used to profile a particular user. When most users learn how accessible their online data is to third parties, including metadata associated with each post (e.g., a time and a location of the post), they often want to delete parts or all of that data from the Web (i.e., be more in control of which parts of their web history remains available and visible to others). However, interacting and deleting personal content, information, comments, etc. from each and every social networking service and/or blog (assuming that a user can remember all of his or her memberships) is cumbersome and time consuming and, therefore, reduces the overall user experience. Accordingly, service providers and device manufacturers face significant technical challenges in providing a centralized service that enables a user to effectively and efficiently delete online data associated with the user across different online services and platforms.

SOME EXAMPLE EMBODIMENTS

Therefore, there is a need for an approach for deleting a user's online data across different services and platforms based on contextual selection criteria.

According to one embodiment, a method comprises determining at least one request to delete data associated with at least one user, the request specifying at least in part one or more contextual parameters. The method also comprises determining one or more data records associated with the at least one user from one or more services, one or more applications, or a combination thereof. The method further comprises causing, at least in part, a deletion of the one or more data records based, at least in part, on whether the data at least substantially meet the one or more contextual parameters.

According to another embodiment, an apparatus comprises at least one processor, and at least one memory including computer program code for one or more computer programs, the at least one memory and the computer program code configured to, with the at least one processor, cause, at least in part, the apparatus to determine at least one request to delete data associated with at least one user, the request specifying at least in part one or more contextual parameters. The apparatus is also caused to determine one or more data records associated with the at least one user from one or more services, one or more applications, or a combination thereof. The apparatus further causes, at least in part, a deletion of the one or more data records based, at least in part, on whether the data at least substantially meet the one or more contextual parameters.

According to another embodiment, a computer-readable storage medium carries one or more sequences of one or more instructions which, when executed by one or more processors, cause, at least in part, an apparatus to determine at least one request to delete data associated with at least one user, the request specifying at least in part one or more contextual parameters. The apparatus is also caused to determine one or more data records associated with the at least one user from one or more services, one or more applications, or a combination thereof. The apparatus further causes, at least in part, a deletion of the one or more data records based, at least in part, on whether the data at least substantially meet the one or more contextual parameters.

According to another embodiment, an apparatus comprises means for determining at least one request to delete data associated with at least one user, the request specifying at least in part one or more contextual parameters. The apparatus also comprises means for determining one or more data records associated with the at least one user from one or more services, one or more applications, or a combination thereof. The apparatus further comprises means for causing, at least in part, a deletion of the one or more data records based, at least in part, on whether the data at least substantially meet the one or more contextual parameters.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for deleting a user's online data across different services and platforms based on contextual selection criteria are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
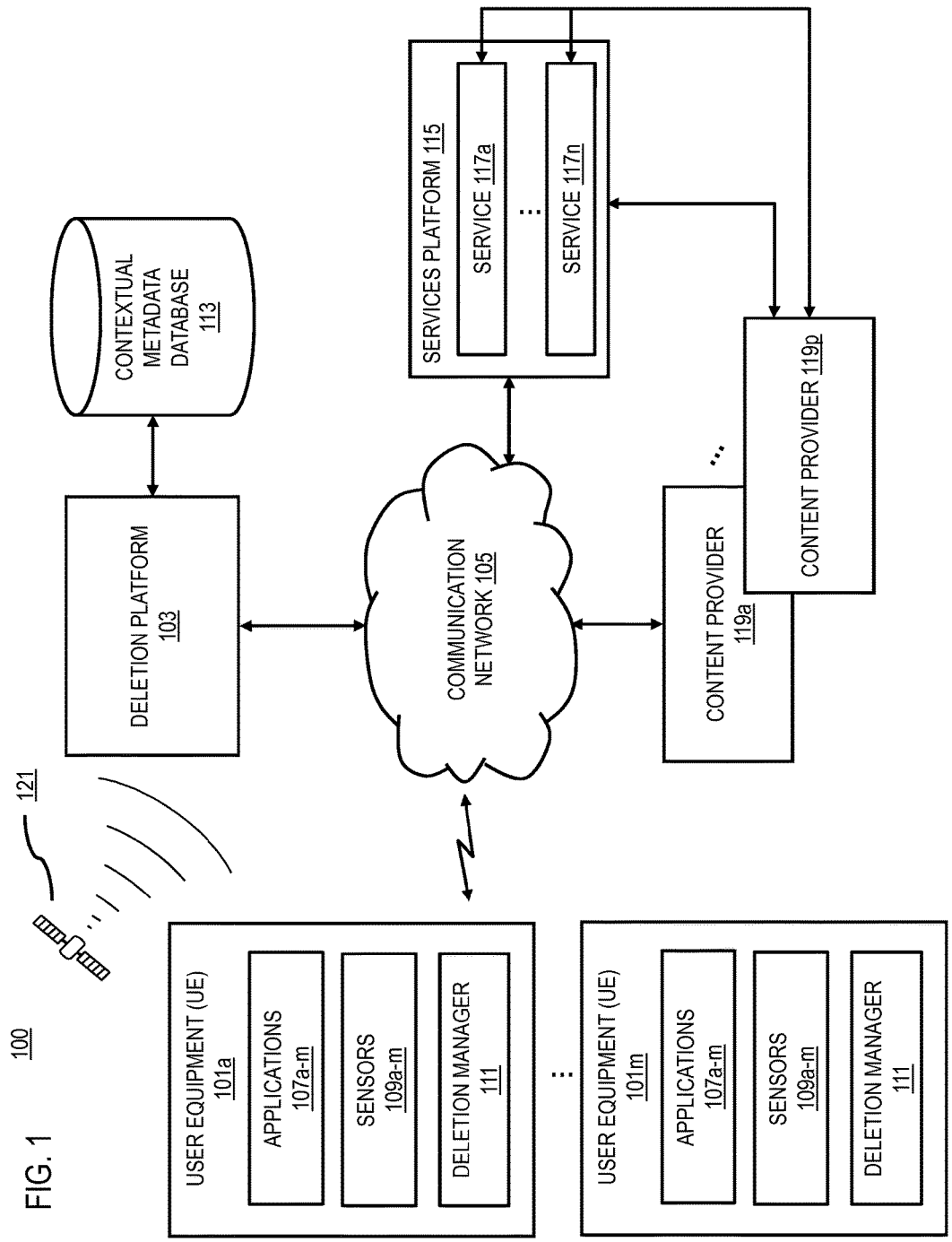
FIG. 1 is a diagram of a system capable of deleting a user's online data across different services and platforms based on contextual selection criteria, according to one embodiment.

FIG. 1 is a diagram of a system capable of deleting a user's online data across different services and platforms based on contextual selection criteria, according to one embodiment. As previously discussed, one area of interest has been the development of online services and platforms that can enable users to more effectively share content, personal information, and/or comments, etc. (i.e., online data) with friends, colleagues, and the public at large on the Web. More specifically, this type of sharing can be in real-time (e.g., posting a current location or status on a social networking service) or more static (e.g., posting a comment or opinion on a blog or message board). Moreover, users are joining a growing number of social networking services and blogs with different content and friends among the networks. As a result, unless specifically prohibited or blocked, much of the online data that a user shares is readily available to third parties (e.g., an employer) and can be unknowingly used to profile a particular user (e.g., someone applying for a job). When most users learn how accessible their online data is to third parties, including metadata associated with each post (e.g., a time and a location of the post), they want to delete parts or all of that data from the Web (i.e., be more in control of which parts of their web history remains available and visible to others). Moreover, over time, a user's interests often change and/or mature and what a user may have considered "cool" in college, for example, he or she may not consider "cool" later as an adult. However, interacting and deleting personal content, information, and/or comments, etc. from each and every social networking service and/or blog associated with a user (assuming that the user can remember all of his or her memberships) is cumbersome and, therefore, reduces the overall user experience. Therefore, service providers and device manufacturers significant technical challenges in providing a centralized service that enables a user to effectively and efficiently delete online data associated with the user across different services and platforms.

To address this problem, a system 100 of FIG. 1 introduces the capability to delete a user's online data across different services and platforms based on contextual selection criteria. In one embodiment, the system 100 first processes and/or facilitates a processing of sensor information associated with one or more devices (e.g., a mobile phone or a tablet) associated with at least one user to cause, at least in part, a generation of contextual metadata (e.g., a time, a location, an activity, a keyword, a surrounding environment including nearby people, etc.). By way of example, the system 100 can generate time-based contextual metadata based, at least in part, on a device clock; location-based contextual metadata based, at least in part, on a global positioning system (GPS) receiver, for example; activity-based contextual metadata based, at least in part, on an accelerometer; contextual metadata based, at least in part, on nearby contacts (e.g., one or more Bluetooth® profiles cross-referenced by the system 100 against user profiles on one or more social networking services) as well as one or more keywords, etc. More specifically, the system 100 generates the contextual metadata in an automated fashion so that the at least one user does not have to provide contextual information (e.g., an activity) for each and every data record or post. Then, in one embodiment, the system 100 causes, at least in part, at least one mapping between the one or more data records and the corresponding contextual metadata based, at least in part, on the sensor information (e.g., GPS). In particular, the system 100 maps or "tags" the contextual metadata to the one or more data records because it is contemplated that the one or more data records are not stored by the system 100, but rather are maintained by the one or more services (e.g. a social networking service).

In one or more embodiments, the system 100 causes, a local storage of the contextual metadata at (1) the one or more devices; (2) at least one server not associated with the one or more services, the one or more applications (e.g., a social networking service application), or a combination thereof; or (3) a combination thereof. For example, the server may be maintained by a trusted (cloud-based) service provider that acts as an agent on behalf of the at least one user. More specifically, by maintaining the contextual metadata separate and apart from the one or more data records stored by the one or more services, the one or more service providers are unaware of the associated contextual metadata. As a result, the system 100 can better protect the privacy sensitive contextual metadata and the privacy of at least one user. This is important because users are generally reluctant to share contextual metadata associated with their mobile devices (e.g., a mobile phone) with the one or more services for fear of misuse and/or mismanagement.

In one embodiment, the system 100 next determines at least one request to delete data associated with at least one user, the request specifying at least in part the one or more contextual parameters. More specifically, the request may be based, at least in part, on one or more physical inputs (e.g., typing on a virtual keyboard), one or more audio inputs (e.g., voice recognition), one or more gestural inputs (e.g., a swiping motion, a tapping, a long press, etc.), etc. Moreover, the data associated with the at least one user includes, at least part, both data posted explicitly by the at least one user as well as data posted by a friend or a stranger, for example, but that may refer to the at least one user (e.g., a "tagged" photograph). As previously discussed, it is contemplated that most users are unpleasantly surprised when they learn the amount of information that can be inferred about them based on a simple web search. And, when they do become aware, they generally want to delete parts or all of their web data (i.e., be more in control of which parts of their web history remains available and visible on the Web). In addition, as previously discussed, a user's priorities and perceptions often evolve over time. For example, what a user may have considered "cool" as an adolescent, he or she may not consider "cool" later as an adult (e.g., when applying for a job). Further, it is contemplated that users may also wish to delete one or more data records to organize their digital lives (e.g., delete data from a website that a user no longer uses or visits). Accordingly, in one embodiment, the at least one user is able to specify to the system 100 user-friendly deletion criteria based, at least in part, on the one or more contextual parameters, the contextual metadata, or a combination thereof.

In one embodiment, the system 100 can determine both syntactic location information (e.g., GPS coordinates) and semantic location information (e.g., "office," "home," "school," etc.). By way of example, the system 100 can enable the at least one user to delete one or more data records while engaged in a particular activity or referring to a specific activity (e.g., a soccer game). In addition, the system 100 can also enable the at least one user to delete one or more data records when the at least one user is nearby specific people (e.g., someone contained within the user's contacts) or when the at least one user was with a particular individual (e.g., an ex-husband or ex-wife). Further, the system 100 can enable the at least one user to combine one or more contextual parameters and/or keywords to cause, at least in part, the deletion of the corresponding data records (e.g., "August" and "office").

In one or more embodiments, the system 100 next determines one or more credentials associated with the at least one user, the one or more devices, or a combination thereof. By way of the example, the one or more credentials may include, at least in part, a login, a username, a password, etc. Moreover, in one embodiment, it is contemplated that at the start of the system 100, the at least one user may be required to input his or her one or more credentials for each of the one or more applicable services in a database, for example. In one embodiment, the system 100 then processes and/or facilitates a processing of the one or more credentials to determine the one or more data records, the one or more services (e.g., a social networking service), the one or more applications (e.g., a social networking application), or a combination thereof. For example, the system 100 can match the one or more stored credentials with the one or more corresponding services to determine the one or more data records associated with the at least one user.

In one embodiment, once the system 100 determines the one or more credentials and the applicable one or more services, the system 100 can process and/or facilitate a processing of the request to cause, at least in part, a transmission of the request to the one or more corresponding services, the one or more corresponding applications, or a combination thereof. In particular, in one embodiment, it is contemplated that the system 100 can transform the deletion request to a service provider specific deletion request and can invoke one or more provider specific deletion application programming interfaces (APIs). Further, in one embodiment, the system 100 functions as a centralized interface (e.g., a user interface (UI)/user experience (UX)) to enable the at least one user to delete the one or more data records associated with the at least one user across one or more applicable services. Consequently, the at least user does not have to open each particular service client (e.g., a social network client) to delete the one or more data records associated with the at least one user.

In one or more embodiments, after the system 100 gains access to the one or more services, the one or more applications, or a combination thereof, the system 100 determines the one or more data records associated with the at least one user from the one or more services, the one or more applications, or a combination thereof. By way of example, the one or more data records may include both real-time updates (e.g., current location posts or status information) and/or more static updates (e.g., comments or opinions posted on a blog or message board). Moreover, as previously discussed, the one or more data records may include, at least in part, any public information about the at least one user accessible online irrespective of the device (e.g., a mobile phone, a tablet, a laptop, etc.), the platform (e.g., an operating system), the application (e.g., a mobile social network application), etc. used to post the one or more data records and irrespective of the provider who holds or stores the one or more data records (e.g., a cellphone carrier, a device original equipment manufacturer (OEM), a social networking service, a web search provider, a mapping platform provider, etc.).

In one embodiment, the system 100 next processes and/or facilitates a processing of the one or more data records to determine contextual metadata associated with the one or more data records, wherein the deletion is further based, at least in part, on the contextual metadata. As previously discussed, the contextual metadata may include, at least in part, a time period, a location, an activity, a keyword, a surrounding environment including nearby people, etc. In particular, in one embodiment, the system 100 can determine the mapped contextual metadata based, at least in part, on the at least one mapping between the one or more data records and the corresponding contextual metadata. Moreover, it is contemplated that the contextual metadata enables the at least one user, the system 100, or a combination thereof to quickly filter the ubiquitous online data records in a user-friendly manner.

In one or more embodiments, the system 100 then causes, at least in part, a deletion of the one or more data records based, at least in part, on whether the data at least substantially meets the one or more contextual parameters. In one example use case, if the one or more contextual parameters include a specific time and a specific location, for example, then the system 100 can cause, at least in part, the deletion of the one or more data records associated with the at least one user that reference that specific time, that specific location, or a combination thereof. Moreover, the system 100 can cause, at least in part, both a physical deletion of the one or more data records as well as a removal of one or more associations between the at least one user and the one or more relevant data records.

In one embodiment, the system 100 causes, at least in part, one or more modifications of the one or more data records based, at least in part, on the at least one request, wherein the deletion includes, at least in part, the one or more modifications. For example, the system 100 can cause, at least in part, a deletion of one or more data records based, at least in part, on a modification of a privacy setting or a visibility level (e.g., family only), a transmission of a privacy violation report to the one or more applicable services (e.g., when the at least one user did not post the data himself or herself, but the data still is associated with the at least one user such as a "tagged" photograph), a manipulation of the content (e.g., blurring someone's face in a picture to hide his or her identity), etc.

In one or more embodiments, the system 100 can also process and/or facilitate a processing of the request, the one or more contextual parameters, or a combination thereof to determine one or more related contextual parameters (i.e., reverse tagging the one or more contextual parameters). More specifically, once the system 100 determines the one or more contextual parameters specified by the at least one user, the system 100 can reverse map the one or more contextual parameters to determine one or more data records associated with the one or more related contextual parameters. For example, a request to delete one or more data records corresponding to location "L" can be reversed mapped or reverse tagged by the system 100 to also include one or more data records corresponding to one or more related contextual parameters regarding the time (t) period time "t1-t2," assuming that the system 100 can determine that the at least one user was in location "L" during the time period "t1-t2." In one embodiment, the system 100 can then cause, at least in part, at least one other deletion based, at least in part, on the one or more related contextual parameters (e.g., location "L" and time period "t1-t2"). Consequently, the system 100 can then cause, at least in part, at least one other deletion of the one or more data records corresponding to the time period "t1-t2" based, at least in part, on the initial request to delete the one or more data records corresponding to location "L".

In one embodiment, the system 100 can also determine one or more search results based, at least in part, on the request, the one or more contextual parameters, the contextual metadata, or a combination thereof. In particular, it is contemplated that the at least one user can input one or more contextual parameters in a user interface element, for example, to determine the one or more corresponding data records on the one or more applicable services. In certain embodiments, the system 100 can then cause, at least in part, a presentation of the one or more search results in the at least one user interface element (e.g., a display of a mobile phone or a tablet).

As shown in FIG. 1, the system 100 comprises one or more user equipment (UE) 101a-101m (e.g., mobile phones and/or tablets) (also collectively referred to as UEs 101) having connectivity to a deletion platform 103 via a communication network 105. The UEs 101 include or have access to one or more applications 107a-107m (also collectively referred to as applications 107). By way of example, the applications 107 may include social networking applications, web browsing applications, word processing applications, mapping and/or navigation applications, media applications, etc. Moreover, the UEs 101 also include one or more sensors 109a-109m (e.g., a GPS receiver, an accelerometer, a Bluetooth® antenna, etc.). In addition, the UEs 101 include a deletion manager 111 that has substantially similar capabilities as the deletion platform 103 and, therefore, is interchangeable with the deletion platform 103.

In one embodiment, the deletion platform 103/deletion manager 111 may include or be associated with at least one contextual metadata database 113. In one example embodiment, the deletion platform 103 may exist in whole or in part within a UE 101, or independently, and the contextual metadata database 113 may exist in whole or in part within a UE 101, the deletion manager 111, or independently. The contextual metadata database 113 may include contextual metadata associated with the at least one user, the one or more devices, or a combination thereof. The contextual metadata database 113 may also include one or more metadata mappings between the one or more data records associated with at least one user and the corresponding contextual metadata. Further, the contextual metadata database 113 also may include one or more credentials associated with the at least one user, the one or more devices, or a combination thereof.

The UEs 101 are also connected to a services platform 115 via the communication network 105. The services platform 115 includes one or more services 117a-117n (also collectively referred to as services 117). The services 117 may include a wide variety of content provisioning services for the applications 107. By way of example, the services 117 may include social networking services, blogging services, mass messaging services, cloud-based storage services, photo manipulation services, location-based services, media services, etc. The UEs 101, the services platform 115, the services 117 also have connectivity to one or more content providers 119a-119p (also collectively referred to as content providers 119) via the connection network 105. The content providers 119 also may provision a wide variety of content (e.g., "tagged" media) to the components of the system 100.

In certain embodiments, the deletion platform 103 and/or one or more of the applications 107 may utilize location-based technologies (e.g., GPS, cellular triangulation, Assisted GPS (A-GPS), etc.) to determine the location of the UEs 101. For example, a UE 101 may include a GPS receiver to obtain geographic coordinates from satellites 121 to determine its current location. In one embodiment, the deletion manager 111 may cause, at least part a generation of the contextual metadata (e.g., location information) based, at least in part, on a position relative to a UE 101.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the deletion platform 103/deletion manager 111 first processes and/or facilitates a processing of sensor information associated with a UE 101 (e.g., from the sensors 109) associated with at least one user to cause, at least in part, a generation of contextual metadata (e.g., a time, a location, an activity, a keyword, a nearby person, etc.). While the deletion platform 103 and the deletion manager 111 are interchangeable, the various embodiments of the present invention disclosed herein mainly reference the deletion manager 111 for the sake of explanation. By way of example, the deletion manager 111 can generate time-based contextual metadata based, at least in part, on a device clock; location-based contextual metadata based, at least in part, on a GPS receiver, for example, activity-based contextual metadata based, at least in part, on an accelerometer; nearby contacts based, at least in part, on Bluetooth® (e.g., one or more Bluetooth® profiles cross-referenced by the deletion manager 111 against one or more user profiles on one or more social networking services), etc. In particular, the deletion manager 111 generates the contextual metadata in an automated fashion so that the at least one user does not have to provide contextual information (e.g., a time period) for each and every data record or post associated with the at least one user. Thereafter, in one embodiment, the deletion manager 111 causes, at least in part, at least one mapping between the one or more data records and the corresponding contextual metadata based, at least in part, on the sensors information.

In one or more embodiments, the deletion manager 111 causes, at least in part, a local storage of the contextual metadata at (1) the UEs 101 (e.g., in the contextual metadata database 113); at least one server not associated with the one or more services 117 (e.g., a social networking service), the applications 107 (e.g., a social networking service application), or a combination thereof; or (3) a combination thereof. More specifically, by maintaining the contextual metadata separate and apart from the one or more data records stored by the services 117, the services 117 are unaware of the associated contextual metadata. Consequently, the deletion manager 111 can better protect the privacy sensitive contextual metadata and the privacy of the at least one user.

In one embodiment, the deletion manager 111 next determines at least one request to delete data associated with at least one user, the request specifying at least in part the one or more contextual parameters. In particular, the data associated with the at least one user includes, at least in part, both data posted explicitly by the at least one user as well as data posted by a friend or a stranger, for example, that may refer to the at least one user (e.g., a "tagged" photograph). Moreover, in one embodiment, the deletion manager 111 can determine both syntactic location information (e.g., GPS coordinates) and semantic location information (e.g., "office," "home," "school," etc.). In addition, the deletion manager 111 can enable the at least one user to delete one or more data records while engaged in a particular activity or referring to a specific activity (e.g., a football game). Moreover, the deletion manager 111 can also enable the at least one user to delete one or more data records when the at least one user is nearby specific people or when the at least one user was with a particular individual. Further, the deletion manager 111 can enable the at least one user to combine one or more contextual parameters and/or keywords to cause, at least in part, the deletion of the corresponding data records.

In one or more embodiments, the deletion manager 111 then determines one or more credentials associated with the at least one user, the UEs 101, or a combination thereof. In particular, in one embodiment, it is contemplated that at the initial start of the deletion manager 111, the at least one user may be required to input his or her one or more credentials for each of the one or more applicable services 117 in the contextual metadata database 113, for example. In one embodiment, the deletion manager 111 next processes and/or facilitates a processing of the one or more credentials to determine the one or more data records, the one or more services 117 (e.g., a social networking service), the one or more applications 107 (e.g., a social networking application), or a combination thereof. By way of example, the deletion manager 111 can match the one or more credentials stored in the contextual metadata database 113, for example, with the one or more corresponding services 117 to determine the one or more data records associated with the at least one user.

In one embodiment, once the deletion manager 111 determines the one or more credentials and the applicable services 117, the deletion manager 111 can process and/or facilitate a processing of the request to cause, at least in part, a transmission of the request to the one or more applicable services 117, the one or more applicable applications 107, or a combination thereof. In particular, in one embodiment, it is contemplated that the deletion manager 111 can transform the deletion request to a service provider specific deletion request and can invoke one or more provider specific deletion APIs. Further, in one embodiment, the deletion manager 111 can function as a centralized interface to enable at least one user to delete the one or more data records associated with the at least one user across the respective services 117.

In one or more embodiments, after the deletion manager 111 gains access to the one or more services 117 (e.g., a social networking service), the one or more applications 107

(e.g., a social networking application), or a combination thereof, the deletion manager 111 determines the one or more data records associated with the at least one user from the one or more services 117, the one or more applications 107, or a combination thereof. As previously discussed, the one or more data records may include, at least in part, any public information about the at least one user accessible online irrespective of the type of UE 101 (e.g., a mobile phone), the platform (e.g., an operating system), the application 107 (e.g., a mobile social network application), etc. used to post the one or more data records and irrespective of the provider (e.g., a service 117 or a content provider 119) that holds or stores the one or more data records (e.g., a cellphone carrier, a device OEM, a social networking service, a web search provider, a mapping platform provider, etc.).

In one embodiment, the deletion manager 111 next processes and/or facilitates a processing of the one or more data records to determine contextual metadata associated with the one or more data records, wherein the deletion is further based, at least in part, on the contextual metadata. In particular, in one embodiment, the deletion manager 111 can determine the contextual metadata based, at least in part, on the at least one mapping between the one or more data records and the corresponding metadata. Further, it is contemplated that the mapped contextual metadata can enable the at least one user, the deletion manager 111, or a combination thereof to quickly filter the ubiquitous online data records in a user-friendly manner.

In one or more embodiments, the deletion manager 111 then causes, at least in part, a deletion of the one or more data records based, at least in part, on whether the data at least substantially meet the one or more contextual parameters. In one example use case, if the one or more contextual parameters include a specific time and a specific location, for example, then the deletion manager 11 can cause, at least in part, the deletion of the one or more data records associated with the at least one user that reference that specific time, that specific location, or a combination thereof. Moreover, the deletion manager 111 can cause, at least in part, both a physical deletion of the one or more data records as well as a removal of one or more associations between the at least one user and the one or more data records. In particular, in one embodiment, the deletion manager 111 causes, at least in part, one or more modifications of the one or more data records based, at least in part, on the at least one request, wherein the deletion includes, at least in part, the one or more modifications. By way of example, the deletion manager 111 can cause, at least in part, a deletion of one or more records based, at least in part, on a modification of a privacy setting or a visibility level, a transmission of a privacy violation report to the one or more applicable services 117, a manipulation of the content, etc.

In one embodiment, the deletion manager 111 can also process and/or facilitate a processing of the request, the one or more contextual parameters, or a combination thereof to determine one or more related contextual parameters (i.e., reverse tagging the one or more contextual parameters). In particular, once the deletion manager 111 determines the one or more contextual parameters specified by the at least one user, the deletion manager 111 can reverse map the one or more contextual parameters to determine one or more data records associated with the one or more related contextual parameters. In one embodiment, the deletion manager 111 can also determine one or more search results based, at least in part, on the request, the one or more contextual parameters, the contextual metadata, or a combination thereof.

More specifically, it is contemplated that the at least one user can input one or more contextual parameters in a user interface element of a UE 101, for example, to determine the one or more corresponding data records on the one or more applicable services 117. In one or more embodiments, the deletion manager 111 can then cause, at least in part, a presentation of the one or more search results in the at least one user interface element (e.g., a display of a mobile phone or a tablet).

By way of example, the UEs 101, the deletion platform 103, the deletion manager 111, the services platform 115, the content providers 119, and the satellites 121 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
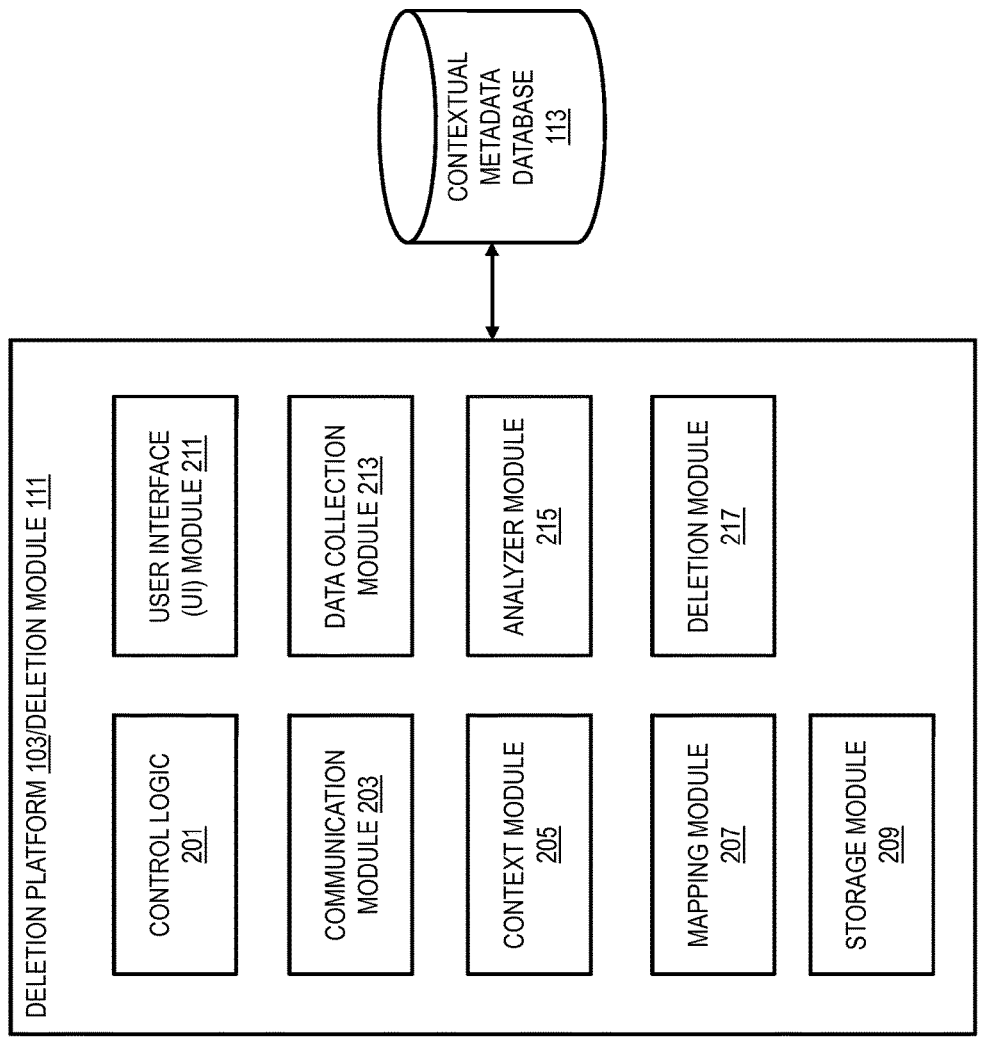
FIG. 2 is a diagram of the components of a deletion platform/deletion manager, according to one embodiment.

FIG. 2 is a diagram of the components of a deletion platform 103/deletion manager 111, according to one embodiment. Again, while the deletion platform 103 and the deletion manager 111 are interchangeable, the various embodiments of the present invention disclosed herein mainly reference the deletion manager 111 for the sake of explanation. By way of example, the deletion manager 111 includes one or more components for deleting a user's online data across different services and platforms based on contextual selection criteria. It is contemplated that the functions of these components may be combined in one or more components or performed by other components of equivalent functionality. In this embodiment, the deletion manager 111 includes a control logic 201, a communication module 203, a context module 205, a mapping module 207, a storage module 209, a user interface (UI) module 211, a data collection module 213, an analyzer module 215, a deletion module 217.

The control logic 201 oversees tasks, including tasks performed by the communication module 203, the context module 205, the mapping module 207, the storage module 209, the UI module 211, the data collection module 213, the analyzer module 215, the deletion module 217. For example, although the other modules may perform the actual task, the control logic 201 may determine when and how those tasks are performed or otherwise direct the other modules to perform the task.

The communication module 203 is used for communication between the UEs 101, the deletion platform 103, the applications 107, the sensors 109, the deletion manager 111, the contextual metadata database 113, the services platform 115, the services 117, the content providers 119, and the satellites 121. The communication module 203 may also be used to communicate commands, requests, data, etc. In one embodiment, the communication module 203, in connection with the UI module 211, may also be used to process and/or facilitate a processing of a request to cause, at least in part, a transmission of the request to the one or more services, the one or more applications, or a combination thereof. In particular, in one embodiment, the communication module 203 can transform the deletion request to a service provider specific deletion request and can invoke one or more provider specific deletion application programming interfaces (APIs). The communication module 203 also may be used in connection with the UI module 211 to cause, at least in part, a presentation of the one or more search results in at least one user interface element (e.g., a display of a mobile device).

The context module 205 is used to process and/or facilitate a processing of sensor information associated with the one or more devices associated with the at least one user to cause, at least in part, a generation of the contextual metadata. For example, the context module 205 can generate time-based contextual metadata based, at least in part, on a device clock; location-based contextual metadata based, at least in part, on a GPS receiver; activity-based information based, at least in part, on an accelerometer; contextual metadata based, at least in part, on nearby contacts (e.g., one or more Bluetooth® profiles cross-referenced by the analyzer module 215 against one or more user profiles on the one or more services) as well as one or more keywords, etc.

In one embodiment, the mapping module 207 is used to cause, at least in part, at least one mapping between the one or more data records and the corresponding contextual metadata based, at least in part, on the sensor information. More specifically, the mapping module 207 may be used to map or tag the contextual metadata to the one or more data records because it is contemplated that the one or more data posts are not stored by the deletion manager 111, but rather are maintained by the one or more services (e.g., a social networking service).

The storage module 209 is used to cause, at least in part, a local storage of the contextual metadata at (1) the one or more devices; (2) at least one server not associated with the one or more services, the one or more applications, or a combination thereof; or (3) a combination thereof. For example, the contextual metadata may be maintained by a trusted (cloud-based) service provider that acts as an agent on behalf of the at least one user. In addition, the storage module 209 may be used to maintain the storage of the contextual metadata, the one or more metadata mappings, or a combination thereof in the contextual metadata database 113. Further, the storage module 209 also may be used to manage the storage of the one or more credentials associated with the at least one user, the one or more devices, or a combination thereof also stored in the contextual metadata database 113.

In one embodiment, the user interface (UI) module 211 is used to determine at least one request to delete data associated with at least one user, the request specifying at least in part one or more contextual parameters. By way of example, the request may be based, at least in part, on one or more physical inputs (e.g., typing on a virtual keyboard), one or more audio inputs (e.g., voice recognition), one or more gestural inputs (e.g., a swiping motion, a tapping, a long press, etc.), or a combination thereof. As previously discussed, the UI module 211, in connection with the communication module 203, also may be used to process and/or facilitate a processing of the request as well as cause, at least in part, a presentation of the one or more search results in at least one user interface element.

The data collection module 213 is used to determine one or more credentials associated with at least one user, the one or more devices, or a combination thereof. More specifically, the one or more credentials may include, at least in part, a login, a username, a password, etc. Moreover, in one embodiment, it is contemplated that during the start of the deletion manager 111, the at least one user may be required to enter his or her one or more credentials associated with the one or more applicable services in a database, for example. The data collection module 213 may also be used to determine one or more data records associated with the at least one user from the one or more services (e.g., a social networking service), the one or more applications (e.g., a social networking application), or a combination thereof. By way of example, the data collection module 213 can determine both real-time updates (e.g., current location posts or status information) and/or more static updates (e.g., posting a comment or opinion on a blog or message board). The data collection module 213 also may be used to determine one or more search results based, at least in part, on the request, the one or more contextual parameters, the contextual metadata, or a combination thereof. In particular, it is contemplated that if the at least one user inputs one or more contextual parameters using the at least one user interface element, for example, then the data collection module 213 can determine the one or more corresponding data records on the one or more services (e.g., a social networking service).

In one embodiment, the analyzer module 215 is used to process and/or facilitate a processing of the one or more credentials to determine the one or more data records, the one or more services, the one or more applications, or a combination thereof. For example, the analyzer module 215 can match the one or more stored credentials and the one or more corresponding services to determine one or more data records associated with the at least one user. The analyzer module 215 may also be used to process and/or facilitate a processing of the one or more data records to determine contextual metadata associated with the one or more data records. Moreover, the analyzer module 215 can determine the contextual metadata based, at least in part, on the at least one mapping between the one or more data records and the contextual metadata. In addition, the analyzer module 215 also may be used to process and/or facilitate a processing of the request, the one or more contextual parameters, or a combination thereof to determine one or more related contextual parameters. In particular, once the analyzer module 215 determines the one or more contextual parameters specified by the at least one user, the analyzer module 215 can reverse map or reverse tag the one or more contextual parameters to determine one or more corresponding data records associated with the one or more related contextual parameters.

The deletion module 217 is used to cause, at least in part, a deletion of the one or more data records based, at least in part, on whether the data at least substantially meet the one or more contextual parameters. In one example use case, if the one or more contextual parameters include a specific time and a specific location, for example, then the deletion module 217 can cause, at least in part, the deletion of the one or more data records associated with the at least one user that reference that specific time, that specific location, or a combination thereof. Moreover, the deletion module 217 can cause, at least in part, both a physical deletion of the one or more data records as well as the removal of one or more associations between the at least one user and the one or more data records. In one embodiment, the deletion module 217 may also be used to cause, at least in part, one or more modifications of the one or more data records based, at least in part, on the at least one request, wherein the deletion, the at least one other deletion, or a combination thereof includes, at least in part, the one or more modifications. For example, the deletion module 217 can delete the one or more data records based, at least in part, on a modification of a privacy setting or a visibility level, a transmission of a privacy violation report to the one or more applicable services, a manipulation of the content, etc. The deletion module 217 also may cause, at least in part, at least one other deletion based, at least in part, on the one or more related contextual parameters. As previously discussed, the analyzer module 215 may determine one or more related contextual parameters (e.g., location "L" and time period "t1-t2") based, at least in part, a reverse mapping or reverse tagging process. More specifically, the deletion module 217 can then cause the deletion of the one or more data records corresponding to time period "t1-t2" based, at least in part, on the request to delete the one or more data records corresponding to location "L".

Figure 3:
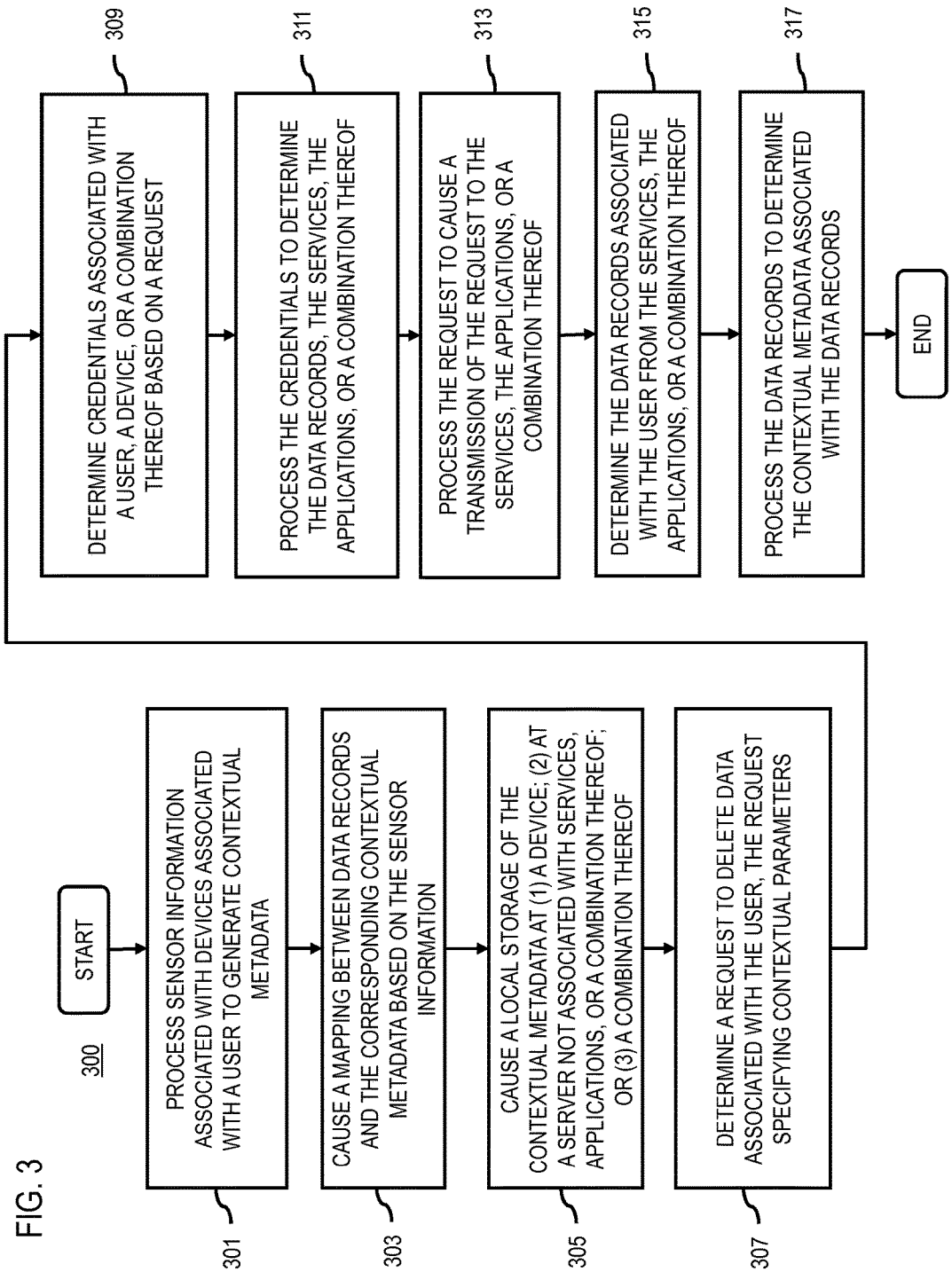
FIGS. 3 and 4 are flowcharts of processes for deleting a user's online data across different services and platforms based on contextual selection criteria, according to one embodiment.
Figure 4:
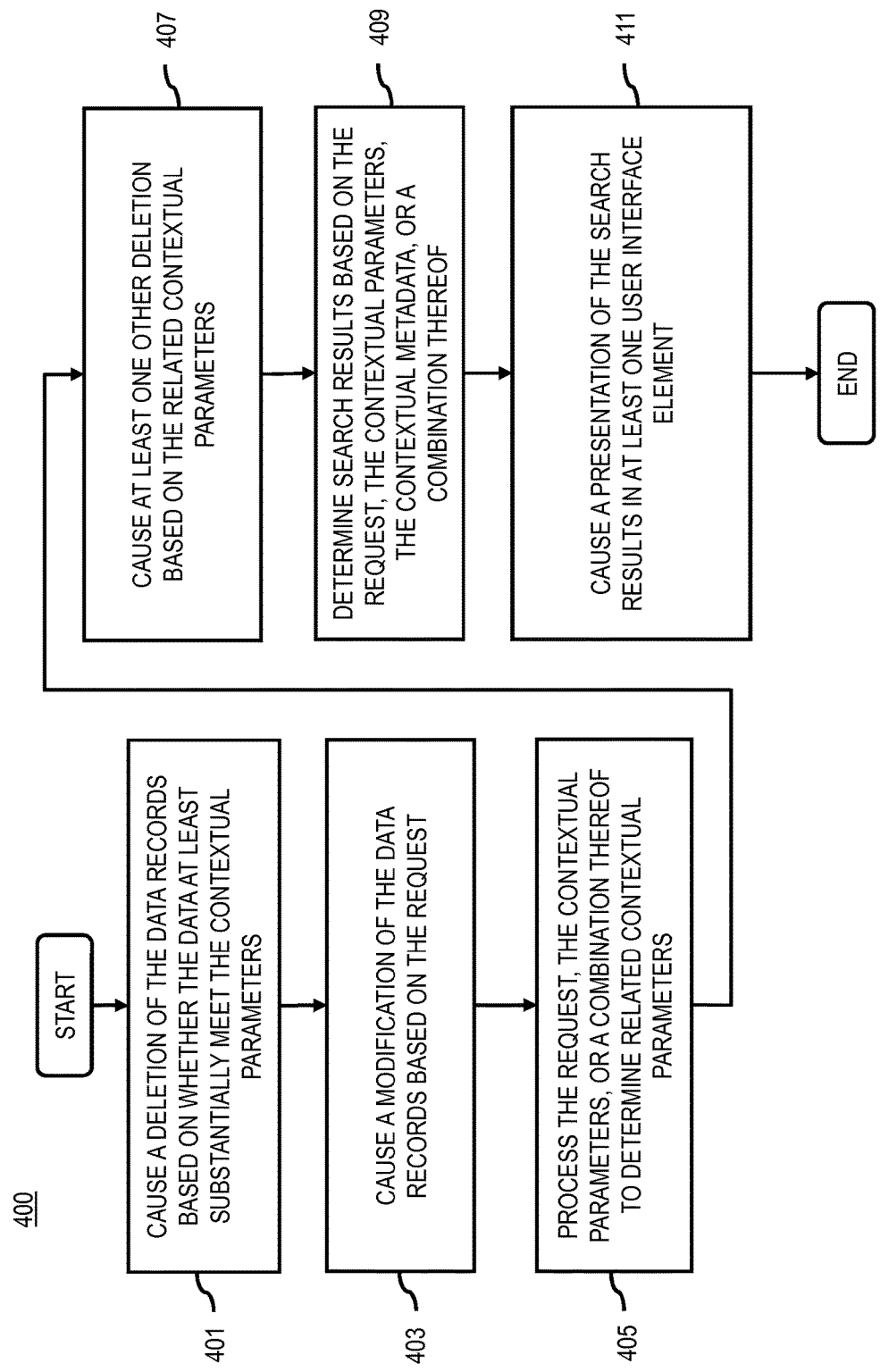
Figure 9:
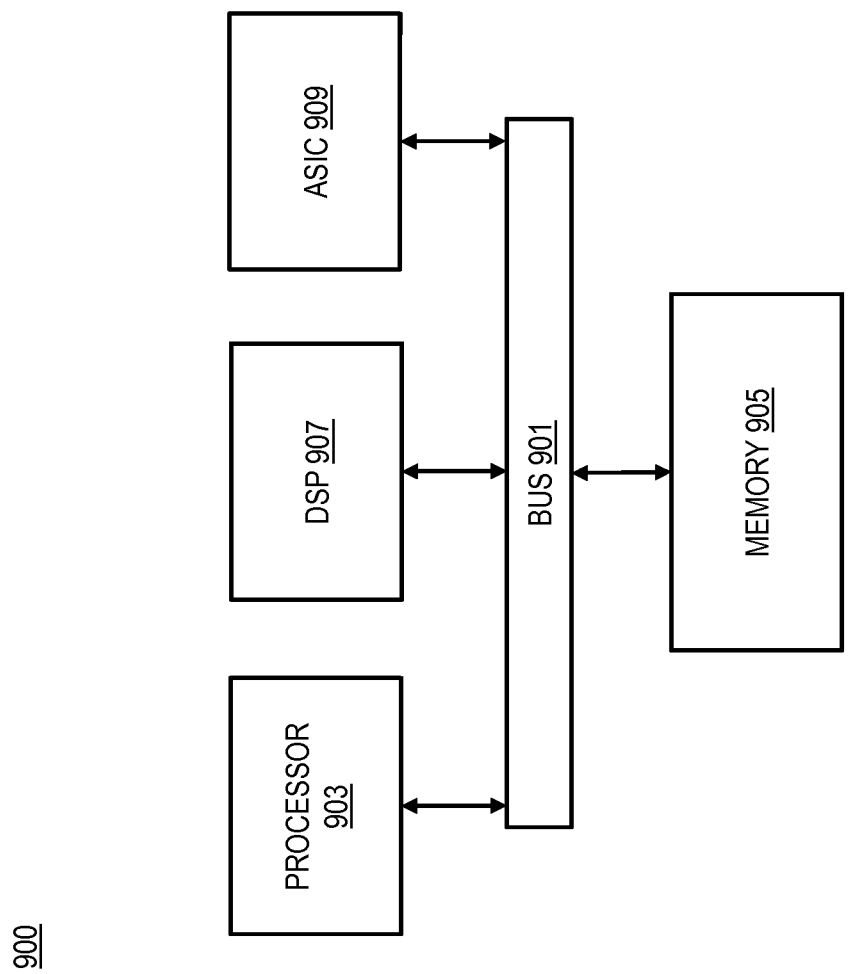
FIG. 9 is a diagram of a chip set that can be used to implement an embodiment of the invention.

FIGS. 3 and 4 are flowcharts of processes for deleting a user's online data across different services and platforms based on contextual selection criteria, according to one embodiment. In particular, FIG. 3 depicts a process 300 of determining one or more relevant data records associated with at least one user. In one embodiment, the deletion platform 103/deletion manager 111 performs the process 300 and is implemented in, for instance, a chip set including a processor and a memory as shown in FIG. 9. In step 301, the deletion manager 111 processes and/or facilitates a processing of sensor information associated with one or more devices associated with the at least one user to cause, at least in part, a generation of the contextual metadata. By way of example, the deletion manager 111 can generate time-based contextual metadata based, at least in part, on a device clock; location-based contextual metadata based, at least in part, on a GPS receiver, for example; activity-based contextual metadata based, at least in part, on an accelerometer; contextual metadata based, at least in part, on nearby contacts (e.g., one or more Bluetooth® profiles cross-referenced by the deletion manager 111 against user profiles on one or more social networking services) as well as one or more keywords, etc. In particular, the deletion manager 111 generates the contextual metadata in an automated fashion so that the at least one user does not have to provide contextual information (e.g., a location) for each and every data record or post associated with the at least one user.

In step 303, the deletion manager 111 causes, at least in part, at least one mapping between the one or more data records and the corresponding contextual metadata based, at least in part, on the sensor information. In one example use case, the deletion manager 111 maps or "tags" the contextual metadata to the one or more data records because it is contemplated that the one or more data records are not stored by the deletion manager 111, but rather are maintained by the one or more services (e.g., a social networking service).

In step 305, the deletion manager 111 causes, at least in part, a local storage of the contextual metadata at (1) the one or more devices; (2) at least one server not associated with the one or more services, the one or more applications, or a combination thereof; or (3) a combination thereof. By way of example, the server may be maintained by a trusted (cloud-based) service provider that acts as an agent on behalf of the at least on one user. In particular, by maintaining the contextual metadata separate and apart from the one or more data records stored by the one or more services, the one or more service providers are unaware of the associated contextual metadata. Consequently, the deletion manager 111 can better protect the privacy sensitive contextual metadata and the privacy of the at least one user. As previously discussed, this is important because users are generally reluctant to share contextual metadata associated with their mobile devices (e.g., a mobile phone or a tablet) with the one or more services for fear of misuse and/or mismanagement of the contextual metadata.

In step 307, the deletion manager 111 determines at least one request to delete data associated with at least one user, the request specifying at least in part one or more contextual parameters. In particular, the request may be based, at least in part, on one or more physical inputs (e.g., typing on a virtual keyboard), one or more audio inputs (e.g., voice recognition), one or more gestural inputs (e.g., a swiping motion, a tapping, a long press, etc.), etc. In addition, the data associated with the at least one user includes, at least in part, both data posted explicitly by the at least one user as well as data posted by a friend or a stranger, for example, that refers to the at least one user (e.g., a "tagged" photograph). Moreover, in one embodiment, the deletion manager 111 can determine both syntactic location information (e.g., GPS coordinates) and semantic location information (e.g., "office," "home," "school," etc.). For example, the deletion manager 111 can enable the at least one user to delete one or more data records while engaged in a particular activity or referring to a specific activity (e.g., family reunion). In addition, the deletion manager 111 can enable the at least one user to delete one or more data records when the at least one user is nearby specific people (e.g., someone listed within the user's contacts) or when the at least one user was with a particular individual (e.g., a former friend). Further, the deletion manager 111 can enable the at least one user to combine one or more contextual parameters and/or keywords to cause, at least in part, the deletion of the corresponding data records (e.g., "August" and "office").

In step 307, the deletion manager 111 determines one or more credentials associated with the at least one user, the one or more devices, or a combination thereof based, at least in part, on the request. In one example use case, the one or more credentials may include, at least in part, a login, a username, a password, etc. Moreover, in certain embodiments, it is contemplated that at the start of the deletion manager 111, the at least one user may be required to input his or her one or more credentials for each of the one or more applicable services in a database, for example. Then in step 309, the deletion manager 111 processes and/or facilitates a processing of the one or more credentials to determine the one or more data records, the one or more services, the one or more applications, or a combination thereof. By way of example, the one or more services may include, at least in part, one or more social networking services that the at least one user is a member of or belongs to and the one or more applications may include, at least in part, one or more social networking applications. In addition, the deletion manager 111 can match the one or more credentials stored in a local database (e.g., the contextual metadata database 113) with the one or more corresponding services to determine the one or more data records associated with the at least one user.

In step 311, the deletion manager 111 processes and/or facilitates a processing of the request to cause, at least in part, a transmission of the request to the one or more services, the one or more applications, or a combination thereof. By way of example, in one embodiment, it is contemplated that the deletion manager 111 can transform the deletion request to a service provider specific deletion request and can invoke one or more provider specific deletion APIs. Further, in one embodiment, the deletion manager 111 can function as a centralized interface (e.g., a UI/UX) to enable the at least one user to delete of the one or more data records associated with the at least one user across one or more respective services. As a result, the at least one user is not required to open each particular service client (e.g. a social network client) to delete the one or more relative data records.

In step 313, once the deletion manager 111 gains access to the one or more services, the one or more applications, or a combination thereof, the deletion manager 111 determines one or more data records associated with the at least one user from one or more services, one or more applications, or a combination thereof. By way of example, the one or more data records may include both real-time updates (e.g., current location posts or status information) and/or more static updates (e.g., comments or opinions posted on a blog or a message board). In addition, as previously discussed, the one or more data records may include, at least in part, any public information about the at least one user accessible online irrespective of the device (e.g., a mobile phone, a tablet, a laptop, etc.), the platform (e.g., an operating system), the application (e.g., a mobile social network application), etc. used to post the one or more data records and irrespective of the provider who holds or stores the one or more data records (e.g., a cellphone carrier, a device OEM, a social networking service, a web search provider, a mapping platform provider, etc.).

In step 315, the deletion manager 111 processes and/or facilitates a processing of the one or more data records to determine contextual metadata associated with the one or more data records, wherein the deletion is further based, at least in part, on the contextual metadata. In one example use case, the contextual metadata may include, at least in part, a time period, a location, an activity, a keyword, a surrounding environment including nearby people, etc. More specifically, in one embodiment, the deletion manager 111 can determine the contextual metadata based, at least in part, on the at least one mapping between the one or more data records and the corresponding contextual metadata. Further, it is contemplated that the mapped contextual metadata enables the at least one user, the deletion manager 111, or a combination thereof to quickly filter the ubiquitous online data records in a user-friendly manner.

FIG. 4 depicts a process 400 of deleting one or more data records associated with at least one user and presenting one or more search results. In one embodiment, the deletion platform 103/deletion manager 111 performs the process 400 and is implemented in, for instance, a chip set including a processor and a memory as shown in FIG. 9. In step 401, the deletion manager 111 causes, at least in part, a deletion of the one or more data records based, at least in part, on whether the data at least substantially meet the one or more contextual parameters. In one example use case, if the one or more contextual parameters include a specific time and a specific location, for example, then the deletion manager 111 can cause, at least in part, the deletion of the one or more data records associated with the at least one user that reference that specific time, that specific location, or a combination thereof. Moreover, the deletion manager 111 can cause both a physical deletion of the one or more data records as well as a removal of one or more associations between the at least one user and the one or more data records.

In step 403, the deletion manager 111 causes, at least in part, one or more modifications of the one or more data records based, at least in part, on the at least one request, wherein the deletion, the at least one other deletion, or a combination thereof includes, at least in part, the one or more modifications. By way of example, the deletion manager 111 can cause, at least in part, a deletion of the one or more data records based, at least in part, on a modification of a privacy setting or a visibility level (e.g. family only), a transmission of a privacy violation report to the one or more applicable services (e.g., when the at least one user did not post the data himself or herself, but the data still is associated with the at least one user such as a "tagged" photograph), a manipulation of the content (e.g., blurring someone's face in a picture to hide his or her identity), etc.

In step 405, the deletion manager 111 optionally processes and/or facilitates a processing of the request, the one or more contextual parameters, or a combination thereof to determine one or more related contextual parameters. In particular, once the deletion manager 111 determines the one or more contextual parameters specified by the at least one user, the deletion manager 111 can reverse map the one or more contextual parameters to determine one or more data records associated with the one or more related contextual parameters. By way of example, a request to delete one or more data records corresponding to location "L" can be reversed mapped or reversed tagged by the deletion manager 111 to also include one or more data records corresponding to related contextual metadata regarding the time period "t1-t2," assuming that the deletion manager 111 can determine that the at least one user was in location "L" during the time period "t1-t2." Then in step 407, the deletion manager 111 causes, at least in part, at least one other deletion based, at least in part, on the one or more related contextual parameters. For example, the one or more related contextual parameters in this example use case may include, at least in part, location "L" and time period "t1-t2." As a result, the deletion manager 111 can then cause, at least in part, at least one other deletion of the one or more data records corresponding to the time period "t1-t2" based, at least in part, on the initial request to delete the one or more data records corresponding to location "L".

In step 409, the deletion manager 111 optionally determines one or more search results based, at least in part, on the request, the one or more contextual parameters, the contextual metadata, or a combination thereof. By way of example, it is contemplated that the at least one user can input one or more contextual parameters in a user interface element, for example, to determine the one or more corresponding data records on one or more applicable services. Then in step 411, the deletion manager 111 can cause, at least in part, a presentation of the one or more search results in at least one user interface element. For example, the deletion manager 111 can present the one or more search results in a display of a mobile phone or a tablet.

Figure 5:
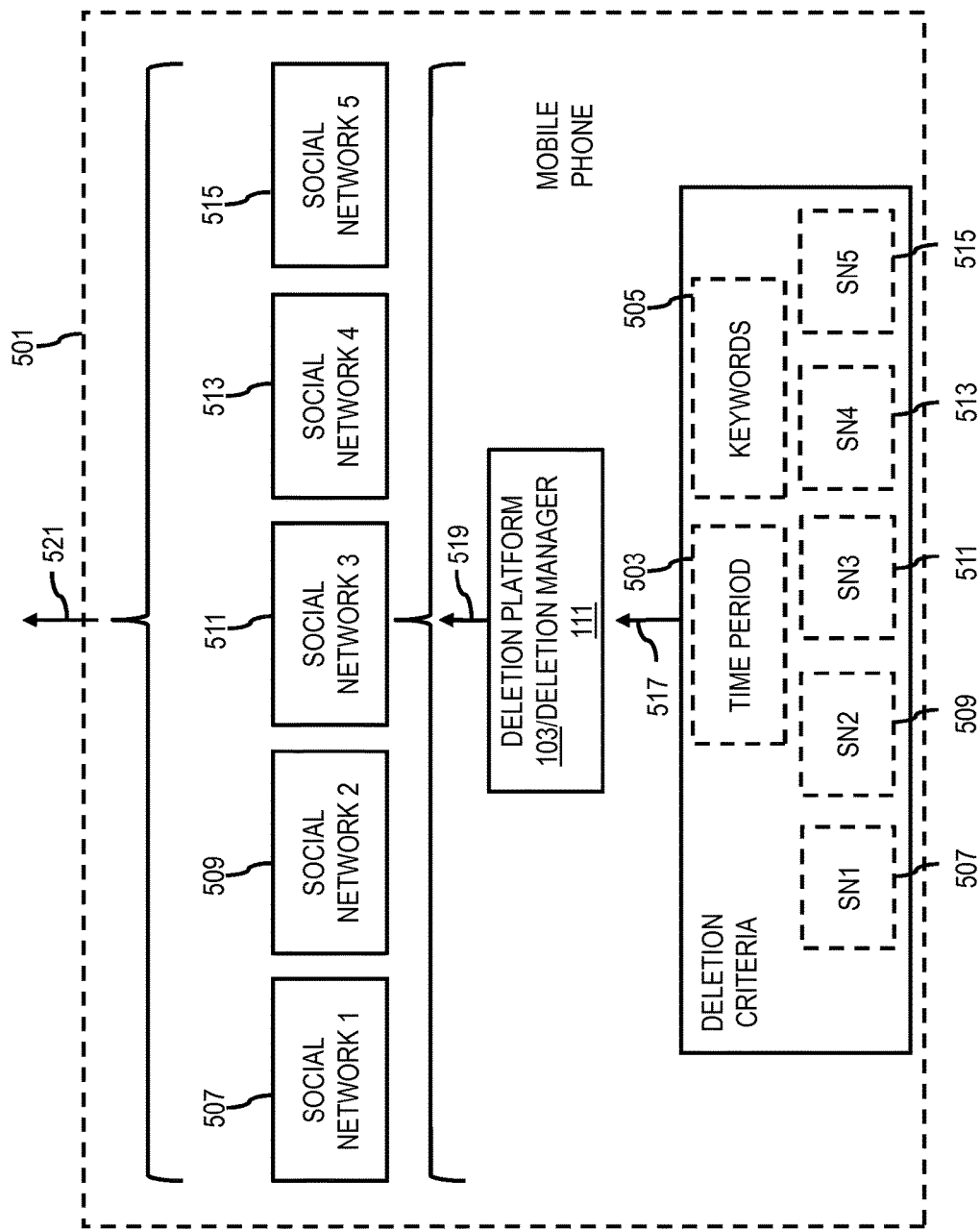
FIGS. 5 and 6 are diagrams of example data flows as utilized in the processes of FIGS. 3 and 4, according to various embodiments.
Figure 6:
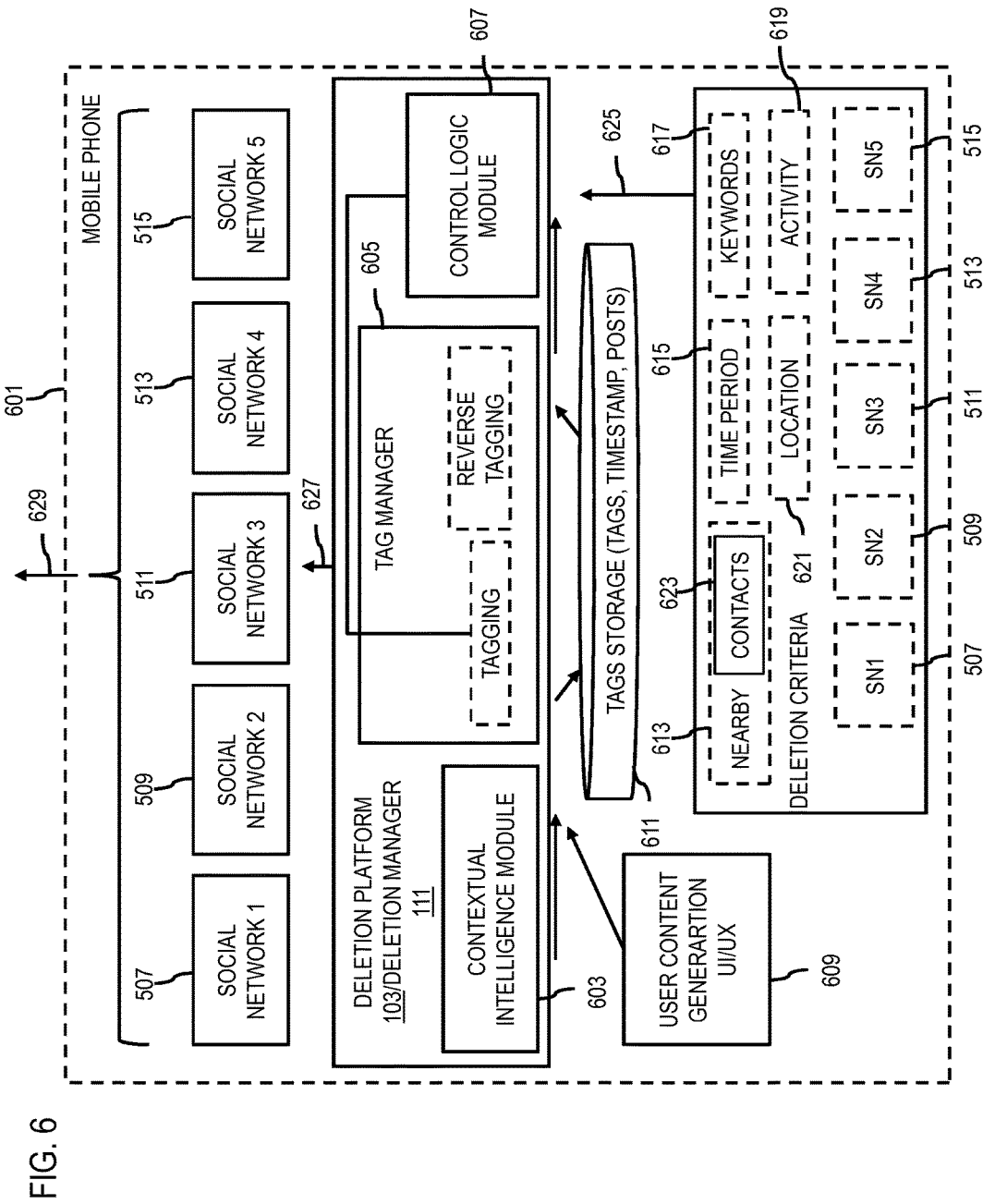

FIGS. 5 and 6 are diagrams of example data flows utilized in the processes of FIGS. 3 and 4, according to various embodiments. As shown, FIG. 5 illustrates an embodiment of the deletion platform 103/deletion manager 111 contained within a simplified user interface 501. As previously discussed, while the deletion platform 103 and the deletion manager 111 of FIGS. 5 and 6 are interchangeable, the various embodiments of the present invention disclosed herein mainly reference the deletion manager 111 for the sake of explanation. As shown, the example user interfaces 501 and 601 of FIG. 6 include one or more user interface elements and/or functionalities created and/or modified based, at least in part, on information, data, and/or signals resulting from the processes (e.g., processes 300 and 400) described with respect to FIGS. 3 and 4.

In one embodiment, the deletion manager 111 determines a request to delete data associated with at least one user, the request specifying at least in part one or more contextual parameters. For example, in this example use case, the one or more contextual parameters include, at least in part, a time period 503 and/or one or more keywords 505. In particular, the deletion manager 111 may determine the request based, at least in part, on one or more physical inputs (e.g., typing on a virtual keyboard), one or more audio inputs (e.g., voice recognition), one or more gestural inputs (e.g., a swiping motion, a tapping, a long press, etc.), etc. as depicted by arrow 517 In one or more embodiments, once the deletion manager 111 determines one or more credentials associated with the at least one user, the one or more devices (e.g., interface 501), or a combination thereof, the deletion manager 111 can process and/or facilitate a processing of the one or more credentials (e.g., a login and a password) to determine one or more data records, one or more services, one or more applications, or a combination thereof. In this example use case, the one or more service include, at least in part, social network 507, social network 509, social network 511, social network 513, and social network 515.

In one embodiment, once the deletion manager 111 determines the one or more credentials and the applicable one or more services (e.g., social networks 507-515), the deletion manager 111 processes and/or facilitates a processing of the request to cause, at least in part, a transmission of the request to the one or more services, the one or more applications, or a combination thereof as depicted by arrow 519. In one or more embodiments, after the deletion manager 111 gains access to the one or more services (e.g., social networks 507-515), the deletion manager 111 determines the one or more one or more data records associated with the at least one user from the one or more services (e.g., social networks 507-515), the one more applications (e.g., a social networking application), or a combination thereof. By way of example, the one or more data records may include both real-time updates (e.g., current location posts or status information) and/or more static updates (e.g., comments or opinions posted on a blog or message board).

In one embodiment, the deletion manager 111 next processes and/or facilitates a processing of the one or more data records to determine contextual metadata associated with the one or more data records, wherein the deletion is further based, at least in part, on the contextual metadata. As previously discussed, the contextual metadata in this example use case includes, at least in part a time period and/or one or more keywords corresponding to the contextual parameters 503 and 505, respectively. In particular, in one embodiment, the deletion manager 111 can determine the contextual metadata based, at least in part, on the at least one mapping between the one or more data records and the corresponding contextual metadata. In one or more embodiments, the deletion manager 111 then causes, at least in part, a deletion of the one or more corresponding data records as depicted by arrow 521 based, at least in part, on whether the data at least substantially meet the one or more contextual parameters (e.g., contextual parameters 503 and 505). However, it is contemplated that in an exemplary embodiment, the deletion manager 111 should allow the at least one user to specify the one or more contextual parameters based, at least in part, on more than just a time period 503 and/or one or more keywords 505.

As shown, FIG. 6 illustrates an embodiment of the deletion platform 103/deletion manager 111 contained within a user interface 601 and based, at least in part, on an extended deletion manager 111 architecture and a number of contextual parameters in contrast to the embodiment of the deletion manager 111 depicted in FIG. 5. In particular, the deletion manager 111 of FIG. 6 includes, at least in part, a contextual intelligence module 603, a tag manager 605, and a control logic module 607. In one embodiment, the deletion manager 111 first processes and/or facilitates a processing of sensor information associated with one or more devices (e.g., interface 601) associated with the at least one user to cause, at least in part, a generation of contextual metadata. In particular, in this example use case, the context intelligence module 603 is responsible for continuously monitoring the one or more sensors of the device (not shown for illustrative purposes) keeping track of the at least one user's context. In one embodiment, the tag manager 605 can generate time-based contextual metadata, location-based contextual metadata, activity-based contextual metadata, contextual metadata based, at least in part, on nearby contacts as well as one or more keywords, etc. In one embodiment, the control logic module 607 like the control logic 201, oversees tasks, including tasks performed by the contextual intelligence module 603 and the tag manager 605. For example, although the other modules may perform the actual task, the control logic module 607 may determine when and how those tasks are performed or otherwise direct the other modules to perform the task.

In one embodiment, the deletion manager 111 then causes, at least in part, at least one mapping between the one or more data records produced by the user content generation UI/UX 609, for example, and the corresponding contextual metadata based, at least in part, on the sensor information determined by the contextual intelligence module 603. In particular, in one embodiment, the tag manager 605 maps or "tags" the contextual metadata to the one or more data records because it is contemplated that the one or more data records are not stored by the deletion manager 111, but rather are maintained by the one or more services (e.g., a social networking service).

In one or more embodiments, the deletion manager 111 causes, a local storage of the contextual metadata in a database (e.g., the tags storage 611). As previously discussed, by maintaining the contextual metadata separate and apart from the one or more data records stored by the one or more services (e.g., in the tags storage 611), the one or more service providers are unaware of the associated contextual metadata. As a result, the deletion manager 111 can better protect the privacy sensitive contextual metadata and the privacy of the at least one user. In one embodiment, the deletion manager 111 next determines at least one request to delete data associated with the at least one user, the request specifying at least in part the one or more contextual parameters. For example, in this example use case, the contextual parameters include, at least in part, nearby contacts 613, time period 615, keywords 617, activity 619, and location 621. By way of example, the deletion manager 111 of FIG. 6 can enable the at least one user to delete one or more data records produced by the user content generation UI/UX 609 while engaged in a particular activity 619 or referring to a specific activity 619 (e.g., a soccer game). Moreover, the deletion manager 111 can also enable the at least one user to delete one or more data records when the at least one user is nearby specific people 613 (e.g., someone listed in the user's contacts 623) or when the at least one user was with a particular individual (e.g., a time period 615). Further, the deletion manager 111 can enable the at least one user to combine one or more contextual parameters (e.g., contextual parameters 613, 615, 619, and 621) and/or keywords 617 to cause, at least in part, the deletion of the corresponding data records (e.g., "August" and "office").

In one or more embodiments, the deletion manager 111 next determines one or more credentials associated with the at least one user, the one or more devices (e.g., interface 601), or a combination thereof. In particular, in one embodiment, it is contemplated that at the initial start of the deletion manager 111, the at least one user may be required to input his or her one or more credentials for each of the one or more services in a database (e.g., the tags storage 611), for example. In this example use case, the one or more applicable services include, at least in part, social network 507, social network 509, social network 511, social network 513, and social network 515. In one embodiment, once the deletion manager 111 determines the one or more credentials and the applicable one or more services (e.g., services 507-515), the deletion manager 111 can process and/or facilitate a processing of the request as depicted by arrow 625 to cause, at least in part, a transmission of the request to the one or more corresponding services (e.g., services 507-515), the one or more corresponding applications, or a combination thereof as depicted by arrow 627.

In one or more embodiments, after the deletion manager 111 gains access to the one or more services (e.g., services 507-515), the one or more applications (e.g., a social network application), or a combination thereof, the deletion manager 111 determines the one or more data records associated with the at least one user (e.g., generated by the user content generation UI/UX 609) from the one or more services (e.g., services 507-515), the one or more applications, or a combination thereof. As previously discussed, the one or more data records may include both real-time updates and/or more static updates. In one or more embodiments, the deletion manager 111 next processes and/or facilitates a processing of the one or more data records to determine contextual metadata associated with the one or more data records, wherein the deletion is further based, at least in part, on the contextual metadata. As previously discussed, the contextual metadata is mapped to the one or more data records by the tag manager 605 and in one embodiment, the deletion manager 111 can determine the contextual metadata based, at least in part, on the at least one mapping between the one or more data records and the corresponding contextual metadata.

In one or more embodiments, the deletion manager 111 then causes, at least in part, a deletion of the one or more data records as depicted by arrow 629 based, at least in part, on whether the data at least substantially meet the one or more contextual parameters (e.g., contextual parameters 613-621. In one example use case, if the one or more contextual parameters (e.g., contextual parameters 613-621) include a specific time period 615 and a specific location 621, for example, then the deletion manager 111 can cause, at least in part, the deletion of the one or more data records associated with the at least one user that reference that specific time period 615, that specific location 621, or a combination thereof. Moreover, the deletion manager 111 can cause, at least in part, both a physical deletion of the one or more data records as well as a removal of one or more associations between the at least one user and the one or more data records.

In one embodiment, the tag manager 605 can also process and/or facilitate a processing of the request 625, the one or more contextual parameters (e.g., contextual parameters 613-621), or a combination thereof to determine one or more related contextual parameters (i.e., reverse tagging the one or more contextual parameters). More specifically, once the deletion manager 111 determines the one or more contextual parameters specified by the at least one user (e.g., one or more contextual parameters 613-621), the tag manager 605 can reverse map the one or more contextual parameters to determine and to delete one or more data records associated with the one or more related contextual parameters.

Figure 7:
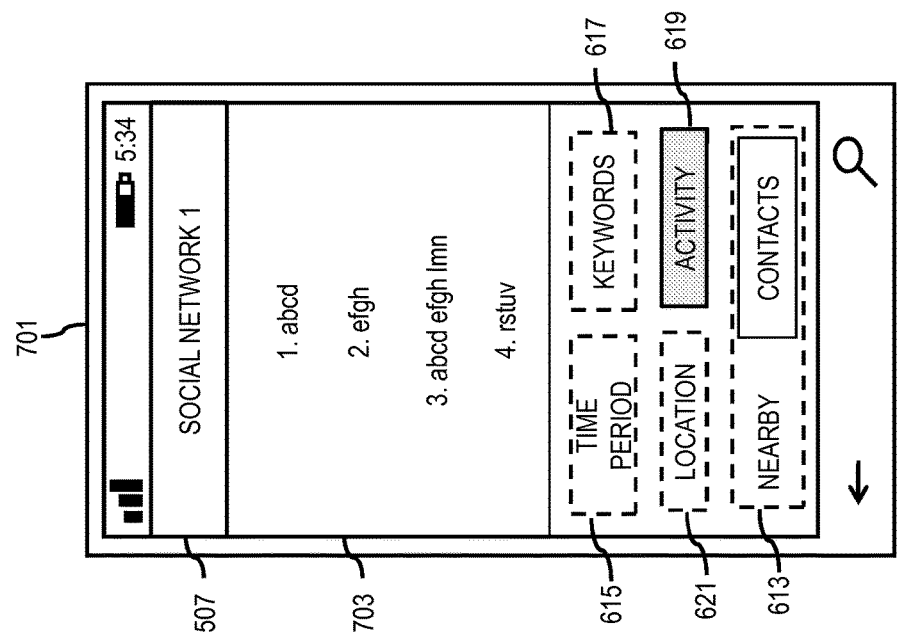
FIG. 7 is a diagram of an example user interface utilized in the process of FIG. 4, according to various embodiments.

FIG. 7 is a diagram of a user interface utilized in the process of FIG. 4, according to various embodiments. As shown, the example user interface of FIG. 7 includes one or more user interface elements and/or functionalities created and/or modified based, at least in part, on information, data, and/or signals resulting from the process (e.g., process 400) described with respect to FIG. 4. More specifically, FIG. 7 illustrates a user interface 701 depicting an advanced search criteria of a social networking service 507. In one embodiment, the system 100 can determine one or more search results (e.g., "abcd," "efgh," "abcd efgh lmn," and "rstuv") based, at least in part, on the request, the one or more context parameters (e.g., context parameters 613-621). More specifically, in one embodiment, it is contemplated that the at least one use can input one or more contextual parameters (e.g., activity 619) in a user interface element 703, for example, to determine the one or more corresponding data records (e.g., "abcd" and "abcd efgh lmn") stored at the one or more applicable services (e.g., social network 509). In certain embodiments, the system 100 can then cause, at least in part, a presentation of the one or more search results in the at least one user interface element 703.

The processes described herein for deleting a user's online data across different services and platforms based on contextual selection criteria may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
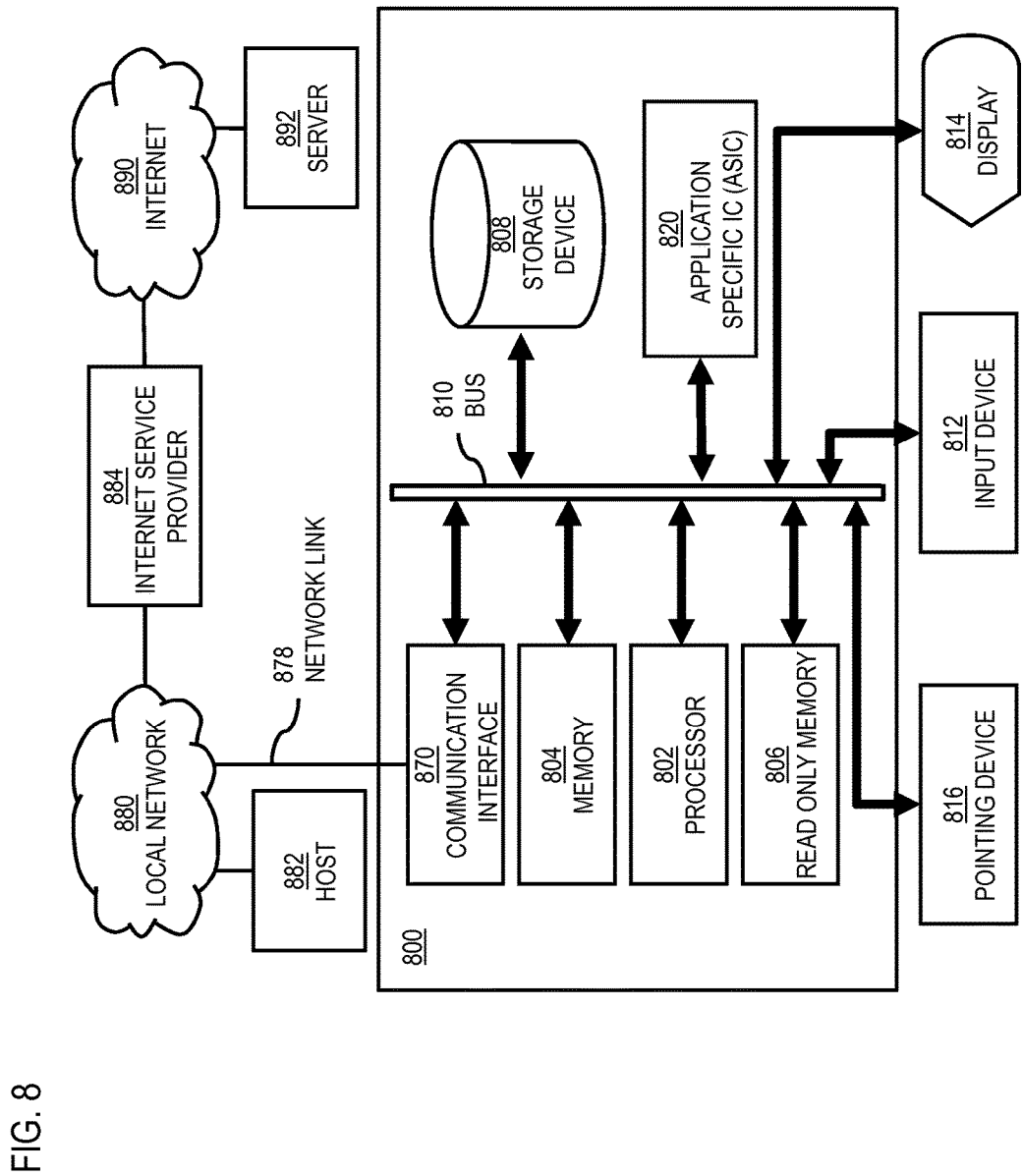
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to delete a user's online data across different services and platforms based on contextual selection criteria as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of deleting a user's online data across different services and platforms based on contextual selection criteria.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to delete a user's online data across different services and platforms based on contextual selection criteria. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for deleting a user's online data across different services and platforms based on contextual selection criteria. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for deleting a user's online data across different services and platforms based on contextual selection criteria, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for deleting a user's online data across different services and platforms based on contextual selection criteria to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to delete a user's online data across different services and platforms based on contextual selection criteria as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of deleting a user's online data across different services and platforms based on contextual selection criteria.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to delete a user's online data across different services and platforms based on contextual selection criteria. The memory 905 also stores the data associated with or generated by the execution of the inventive steps.

Figure 10:
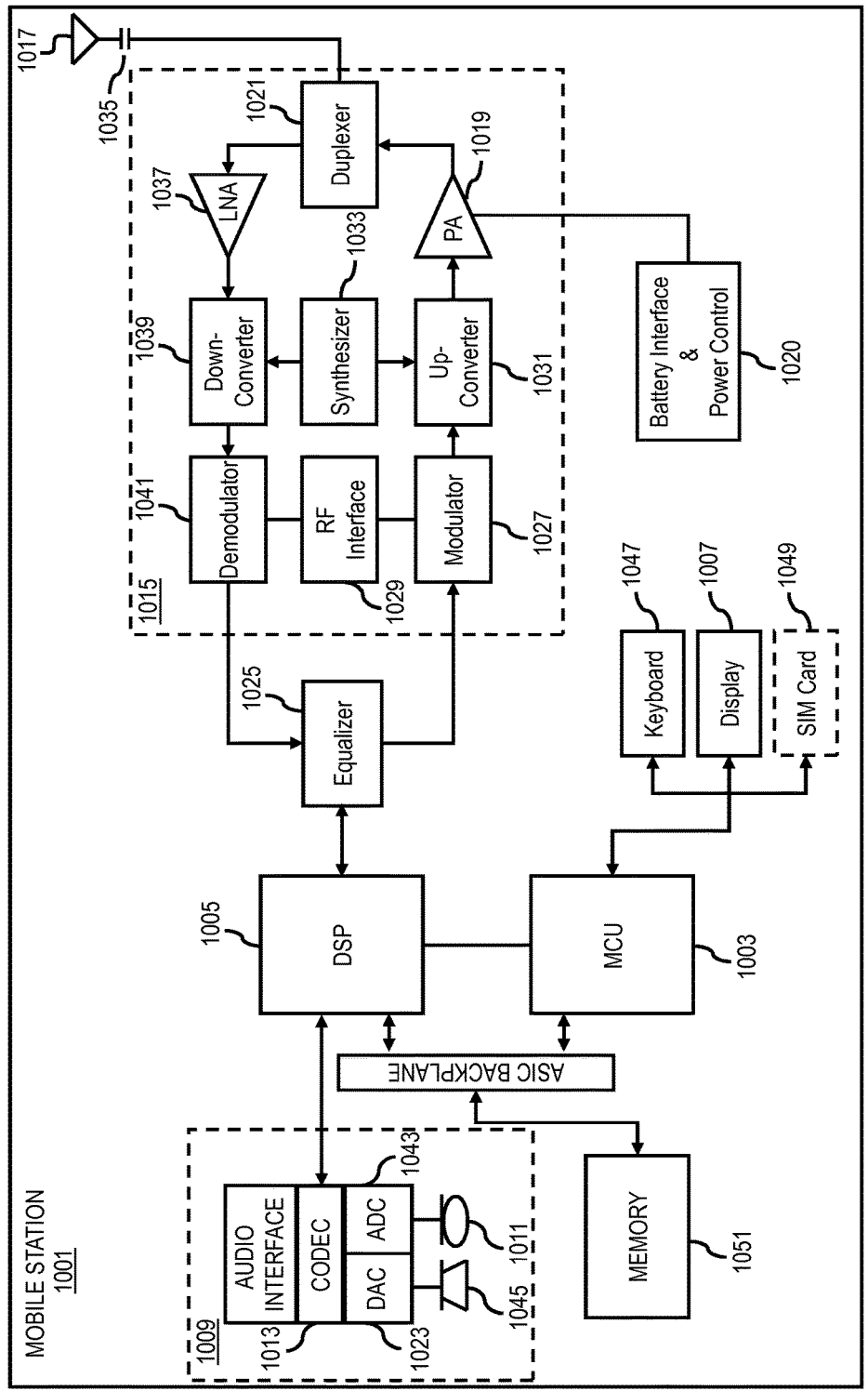
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of deleting a user's online data across different services and platforms based on contextual selection criteria. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of deleting a user's online data across different services and platforms based on contextual selection criteria. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to delete a user's online data across different services and platforms based on contextual selection criteria. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing one or more data records to determine respective contextual metadata associated with the one or more data records, wherein the respective contextual metadata is generated based on sensor information detected from an external environment of one or more devices, wherein the data records are transmitted to at least one remote service;
   maintaining, on a computing device separate from the at least one remote service, a mapping between the data records transmitted to the at least one remote service and the respective contextual metadata associated with each of the data records;
   determining at the computing device at least one request to delete data associated with at least one or more contextual parameters;
   determining from the mapping maintained by the computing device, one or more data records transmitted to the at least one remote service and associated with the one or more contextual parameters;
   causing transmission of a request to the at least one remote service to delete remote data records determined from the mapping as associated with the one or more contextual parameters.

2. A method of claim 1, wherein the one or more contextual parameters, the contextual metadata, or a combination thereof comprises a time period, a keyword, a location, an activity, or a combination thereof.

3. A method of claim 1, further comprising:
   processing the request, the one or more contextual parameters, or a combination thereof to determine one or more related contextual parameters; and
   causing at least one other deletion based on the one or more related contextual parameters.

4. A method of claim 1, further comprising:
   determining one or more search results based on the request, the one or more contextual parameters, the contextual metadata, or a combination thereof; and
   causing presentation of the one or more search results in at least one user interface element.

5. A method of claim 1, further comprising:
   determining one or more credentials associated with at least one user, one or more devices, or a combination thereof based on the request; and processing the one or more credentials to determine the one or more data records, the one or more services, the one or more applications, or a combination thereof.

6. The method of claim 1, wherein the contextual metadata comprises information indicating detection, via near-field communication, of at least a nearby device to that of one or more devices, associated with at least one of capture or storage of the respective one or more data records.

7. The method of claim 6, wherein the at least one of the capture or the storage of the respective one or more data records is determined as performed during a time period associated with the detection, via near-field communication, of the at least the nearby device to that of the one or more devices.

8. The method of claim 7, wherein the at least one of the capture or the storage of the respective one or more data records determined as performed during the time period associated with the detection is indicative of a specific contact being nearby the one or more devices at the time of the at least one of the capture or the storage of the one or more data records.

9. An apparatus comprising:
at least one processor; and
at least one memory including computer program code for one or more programs,
the at least one memory and the computer program code configured to, with the at least one processor, cause the apparatus to perform at least the following:
process one or more data records to determine respective contextual metadata associated with the one or more data records, wherein the respective contextual metadata is generated based on sensor information detected from an external environment of one or more devices, wherein the data records are transmitted to at least one remote service;
maintain, on a computing device separate from the at least one remote service, a mapping between the data records transmitted to the at least one remote service and the respective contextual metadata associated with each of the data records;
determine at the computing device at least one request to delete data associated with at least one or more contextual parameters;
determine from the mapping maintained by the computing device, one or more data records transmitted to the at least one remote service and associated with the one or more contextual parameters;
cause transmission of a request to at least one remote service to delete remote data records determined from the mapping as associated with the one or more contextual parameters.

10. An apparatus of claim 9, wherein the one or more contextual parameters, the contextual metadata, or a combination thereof comprises a time period, a keyword, a location, an activity, or a combination thereof.

11. An apparatus of claim 9, wherein the apparatus is further caused to:
process the request, the one or more contextual parameters, or a combination thereof to determine one or more related contextual parameters; and
cause at least one other deletion based on the one or more related contextual parameters.

12. An apparatus of claim 9, wherein the apparatus is further caused to:
determine one or more search results based on the request, the one or more contextual parameters, the contextual metadata, or a combination thereof; and
cause a presentation of the one or more search results in at least one user interface element.

13. An apparatus of claim 9, wherein the apparatus is further caused to:
cause storage of the contextual metadata at (1) the one or more devices; (2) at least one server not associated with the one or more services, the one or more applications, or a combination thereof;
or (3) a combination thereof.

14. An apparatus of claim 9, wherein the apparatus is further caused to:
determine one or more credentials associated with at least one user, one or more devices, or a combination thereof based on the request; and
process the one or more credentials to determine the one or more data records, the one or more services, the one or more applications, or a combination thereof.

15. The apparatus of claim 9, wherein the contextual metadata comprises information indicating detection, via near-field communication, of at least a nearby device to that of one or more devices, associated with at least one of capture or storage of the respective one or more data records.

16. The apparatus of claim 15, wherein the at least one of the capture or the storage of the respective one or more data records is determined as performed during a time period associated with the detection, via near-field communication, of the at least the nearby device to that of the one or more devices.

17. The apparatus of claim 16, wherein the at least one of the capture or the storage of the respective one or more data records determined as performed during the time period associated with the detection is indicative of a specific contact being nearby the one or more devices at the time of the at least one of the capture or the storage of the one or more data records.

* * * * *

UNITED STATES PATENT AND TRADEMARK OFFICE
CERTIFICATE OF CORRECTION

PATENT NO. : 10,229,138 B2
APPLICATION NO. : 13/628146
DATED : March 12, 2019
INVENTOR(S) : Biswas et al.

Page 1 of 1

It is certified that error appears in the above-identified patent and that said Letters Patent is hereby corrected as shown below:

In the Claims

Column 30
Line 43, "one or more contextual parameters;"
Should read:
--one or more contextual parameters; and--

Column 31
Line 47, "the one or more contextual parameters;"
Should read:
--the one or more contextual parameters; and--

Signed and Sealed this
Seventh Day of January, 2020

Andrei Iancu
*Director of the United States Patent and Trademark Office*